No. 776,207. PATENTED NOV. 29, 1904.
E. W. SMITH.
STAFF SYSTEM AND APPARATUS FOR CONTROLLING TRAFFIC ON SINGLE LINE RAILWAYS.
APPLICATION FILED MAY 31, 1904.
NO MODEL. 8 SHEETS—SHEET 1.

Witnesses

Inventor.
Edward Wythe Smith
by John M. O'Donnell
Attorney.

No. 776,207. PATENTED NOV. 29, 1904.
E. W. SMITH.
STAFF SYSTEM AND APPARATUS FOR CONTROLLING TRAFFIC ON SINGLE LINE RAILWAYS.
APPLICATION FILED MAY 31, 1904.
NO MODEL. 8 SHEETS—SHEET 2.

No. 776,207. PATENTED NOV. 29, 1904.
E. W. SMITH.
STAFF SYSTEM AND APPARATUS FOR CONTROLLING TRAFFIC ON SINGLE LINE RAILWAYS.
APPLICATION FILED MAY 31, 1904.
NO MODEL. 8 SHEETS—SHEET 3.

Witnesses, Inventor, Edward Wythe Smith

No. 776,207. PATENTED NOV. 29, 1904.
E. W. SMITH.
STAFF SYSTEM AND APPARATUS FOR CONTROLLING TRAFFIC ON SINGLE LINE RAILWAYS.
APPLICATION FILED MAY 31, 1904.
NO MODEL. 8 SHEETS—SHEET 4.

No. 776,207. PATENTED NOV. 29, 1904.
E. W. SMITH.
STAFF SYSTEM AND APPARATUS FOR CONTROLLING TRAFFIC ON SINGLE LINE RAILWAYS.
APPLICATION FILED MAY 31, 1904.
NO MODEL. 8 SHEETS—SHEET 6.

Fig. 10.

No. 776,207. PATENTED NOV. 29, 1904.
E. W. SMITH.
STAFF SYSTEM AND APPARATUS FOR CONTROLLING TRAFFIC ON SINGLE LINE RAILWAYS.
APPLICATION FILED MAY 31, 1904.
NO MODEL. 8 SHEETS—SHEET 7.

Fig. 11.

Witnesses
Inventor,
Edward Wythe Smith,
by
Attorney.

No. 776,207. PATENTED NOV. 29, 1904.
E. W. SMITH.
STAFF SYSTEM AND APPARATUS FOR CONTROLLING TRAFFIC ON SINGLE LINE RAILWAYS.
APPLICATION FILED MAY 31, 1904.
NO MODEL. 8 SHEETS—SHEET 8.

Fig. 13.

Witnesses.

Inventor,
Edward Wythe Smith
by John B. O'Donnell
Attorney.

No. 776,207. Patented November 29, 1904.

UNITED STATES PATENT OFFICE.

EDWARD WYTHE SMITH, OF CHELSEA, LONDON, ENGLAND.

STAFF SYSTEM AND APPARATUS FOR CONTROLLING TRAFFIC ON SINGLE-LINE RAILWAYS.

SPECIFICATION forming part of Letters Patent No. 776,207, dated November 29, 1904.

Application filed May 31, 1904. Serial No. 210,607. (No model.)

*To all whom it may concern:*

Be it known that I, EDWARD WYTHE SMITH, a subject of the King of Great Britain and Ireland, residing at 66 College street, Chelsea, in the county of London, England, (whose post-office address is 66 College street, Chelsea, in the county of London, England,) have invented certain new and useful Improvements in and Relating to Staff Systems and Apparatus for Controlling Traffic on Single-Line Railways; and I do hereby declare the following to be a full, clear, and exact description of the invention, such as will enable others skilled in the art to which it appertains to make and use the same.

With the staff apparatus now in general use it is necessary for the driver to stop or reduce the speed of the train considerably in order to exchange staffs.

The present invention consists in a staff instrument and staffs which are much smaller and the staffs consequently much lighter than those now in general use, so that the staffs can be more readily exchanged when a train is in motion and running at a high speed.

Further, the apparatus, according to this invention, comprises, first, means for preventing a staff being wrongly placed in an instrument; second, means for preventing the staff or staffs being illegitimately withdrawn from an instrument; third, means for preventing a staff belonging to an instrument relating to a certain section of the railway being placed in an instrument relating to another section; fourth, indicator mechanism for indicating whether the block-section is occupied by a train or not and, in addition, indicating the departure of a train in the direction from the station, and, fifth, apparatus whereby an intermediate station or block-section may be closed when desired, thus converting two short sections into one longer one.

Finally, the invention comprises the arrangement or combination of parts, details of construction, and the features as hereinafter fully described and more particularly set forth in the statement of claims.

The apparatus, according to this invention, provides greater security against unauthorized or incorrect manipulation and at the same time provides increased efficiency in the working of the traffic on the railway. The instruments and staffs employed with this apparatus are less than half the size of those now generally in use.

In general principle the staff instruments according to this invention are similar to the well-known Webb & Thompson apparatus as now generally in use, the several disks and the means for locking same being also similar in general arrangement and working to those of the well-known instruments.

The accompanying drawings illustrate the apparatus comprising my invention.

Fig. 8 is a part side elevation and part section.

The same characters indicate corresponding parts in the several figures of the drawings.

Figure 1:
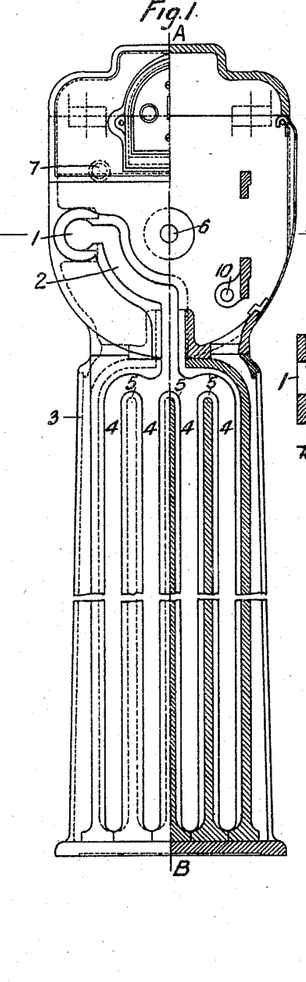
Figure 1 is a half-front elevation and half-section of the staff instrument.
Figures 2, 14:
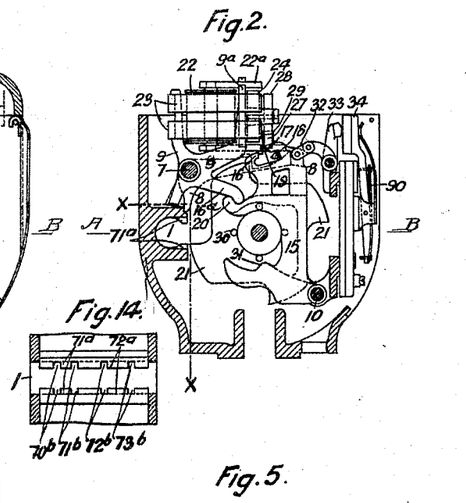
Fig. 2 is a sectional view of the head of the instrument, showing the mechanism as hereinafter described.
Fig. 14 is a part section of Fig. 2 taken on line X X, showing additional or alternative means (hereinafter described) for preventing staffs being wrongly placed in an instrument.
Figure 3:
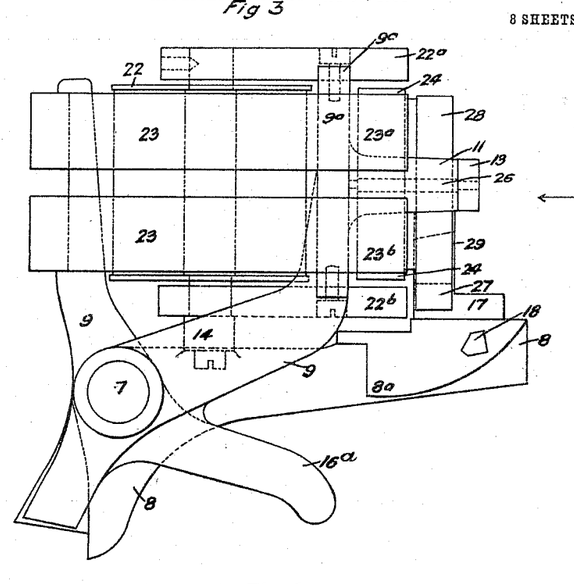
Fig. 3 is a view of the electromagnet and its lever, together with the locking-lever controlled by the magnet, and shows the means for lifting the locking-lever when the magnet is energized by a current sent by the signalman at the section in advance.
Figure 4:
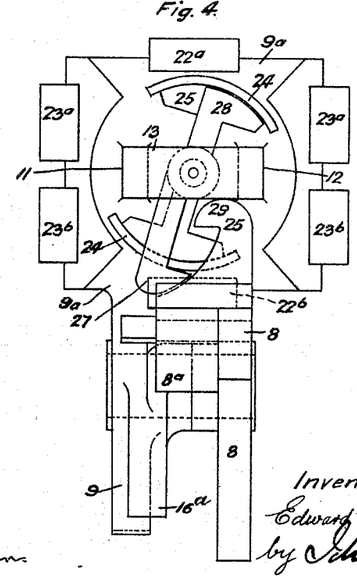
Fig. 4 is an end view of Fig. 3 looking in the direction of the arrow.

Referring first to Figs. 1 and 2, 1 is the opening in the head of the instrument through which the staffs are inserted in and withdrawn from the instrument, 2, Fig. 1, being the curved passage connecting with 1 and leading into the magazine 3. 4 represents the compartments or chambers of the magazine for containing the staffs, said compartments being separated by partitions 5. 6 is the spindle or shaft on which the disks revolve, 7 the spindle on which the several mechanical locking-pawls as well as the electrically-controlled locking-lever 8 and electromagnet-lever 9 (see Fig. 2) turn, and 10 is a pin or spindle on which the safety-lever turns. The electromagnet-lever 9, as shown in Figs. 2, 3, and 4, is provided with four arms extending from the center or boss on which it turns, the two upwardly-projecting arms supporting the electromagnet device. $9^a$ is a rectangular head or plate provided or formed on the right-hand upright arm of lever 9, and said plate has two projecting lugs 11 12, on the outer ends of which is screwed or otherwise fixed a bridge-piece 13. 14 is a projection or shelf on lever 9, forming an additional support for the electromagnet. The safety-lever 15 is provided in order to prevent the illegitimate withdrawal of a staff from the instrument by jerking the staff or otherwise when permission has not been given by the signalman in the cabin in advance sending the necessary electric current. 16 and 17 are arms or projections on safety-lever 15, adapted to engage the pin or projection 18 on locking-lever 8. 19 is the open space between the arms 16 and 17 for the pin 18 to pass through when the staff is to be withdrawn by sanction given from the cabin in advance. 20 is another arm or projection on safety-lever 15, engaging the arm $16^a$ of the electromagnet-lever 9. 21 is the locking-disk of the well-known form, which is controlled—that is to say, locked and released—through the action of the signalman of the section in advance by the electromagnet device 22, mounted on the lever 9. This electromagnetic device consists of a combination of an electromagnet and a permanent magnet or magnets. 22 is the electromagnet-coil, and 23 represents permanent magnets. $22^a$ and $22^b$ are the poles of the electromagnet, and $23^a$ and $23^b$ poles of the permanent magnets. The permanent magnets are attached to the left-hand upright arm of lever 9, Figs. 2, 3, and 4, by screws or otherwise, and said magnets are also similarly attached to the head or plate $9^a$, to which plate the pole-pieces $22^a$ $22^b$ of the electromagnet are also attached. 24 is an armature supported by a non-magnetic piece 25, Fig. 4, carried on a spindle 26. The spindle 26 is supported at one end by plate $9^a$ and at its other end by the bridge-piece 13. 27 is a hook fixed on spindle 26 and counterbalanced at 28, said hook being adapted to engage the hook 29, attached to the locking-lever 8 when a current passes through the electromagnet-coil 22 in the correct direction. When the electromagnet is thus energized, the armature 24 will by means of the spindle 26 cause the hook 27 to move until on raising the lever 9, as hereinafter described, hook 27 will engage hook 29, so that on the further movement of lever 9 the locking-lever 8 will be raised free of the disk 21, which is thus unlocked, through the piece or projection $8^a$ being lifted clear of the extreme edge of the disk. In the normal condition when there is no current flowing 27 is held by the counterbalance 28 away from the hook 29, as shown in Fig. 4. On disk 21 are provided pins 30, Fig. 2, and on the safety-lever 15 a projection 31 is provided, whereby should the safety-lever through any cause remain up after having been moved during the withdrawal of a staff from the instrument when the disk 21 is further turned by the withdrawal of the staff from the instrument the pins 30 or one of them will engage projection 31, and so force the lever 15 down into the normal position, as shown. 32 is a link connecting the safety-lever 15 with the cam 33, which operates the commutator-lever 34, which latter may be of the known or any convenient form.

The lower ends of levers 8 and 9 bear on a shelf or projection in the head of the instrument-casing, as shown in Fig. 2.

Figure 5:
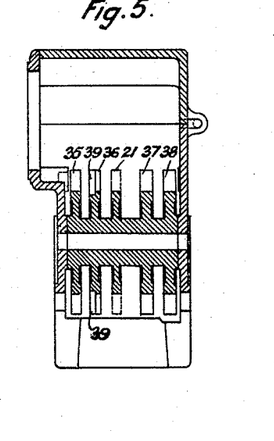
Fig. 5 is a transverse section of the head of the instrument, taken on line A B, Figs. 1 and 2, showing the disks in section, the remaining mechanism having been removed.
Figure 6:
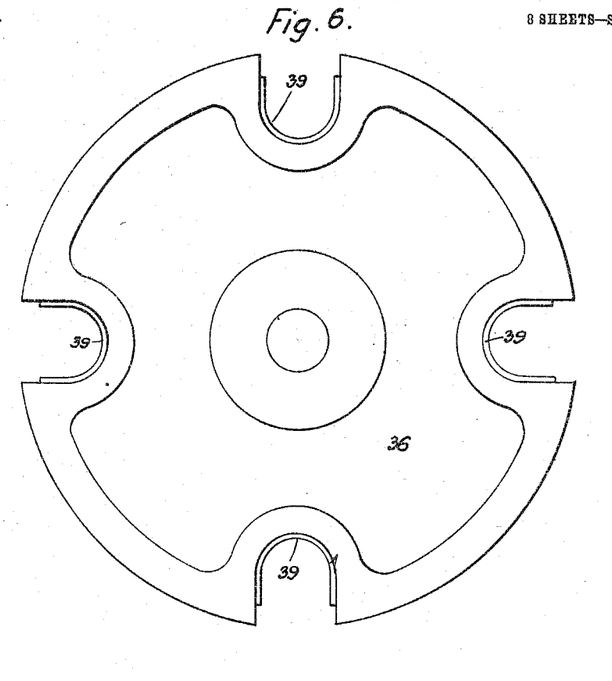
Figs. 6 and 7 are respectively a front elevation and plan view of one of the disks employed according to this invention.
Figure 7:
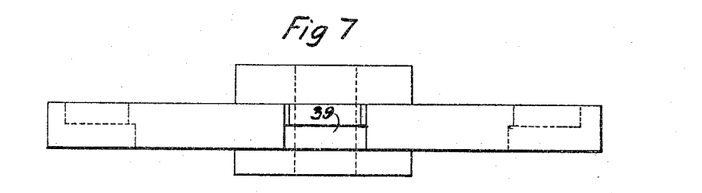

35, 36, 37, and 38, Fig. 5, are the disks provided with four recesses with which the usual locking pawls or levers adapted to be actuated by the withdrawal of a staff from and its insertion in the instrument engage, the levers or pawls being disengaged from said recesses by the action of withdrawing or inserting a staff.

In the staff instruments hitherto employed guards have been provided on the exterior of the head of the instrument and a fifth ring provided on each staff, which ring is adapted to engage a groove or slot in the guard, the position of said ring on the staffs and of the slots in the guards being varied in different instruments in order to prevent a staff being wrongly placed in an instrument or to prevent staffs belonging to one instrument being inserted in another.

Figure 12:
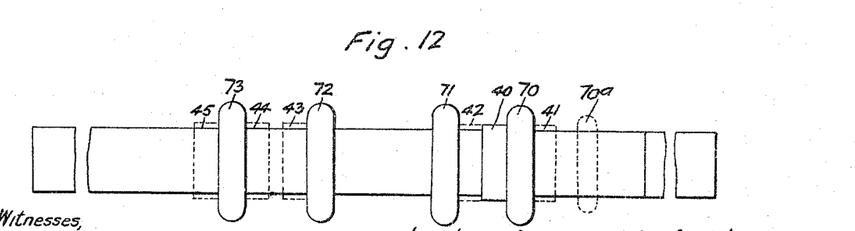
Fig. 12 illustrates a staff according to this invention, showing the projections hereinafter described.

In Figs. 5, 6, and 7, 39 represents grooves or recesses in the usual notches in one of the disks 36 (such recesses may be provided in more than one disk, if desired) with which the staff engages, said recesses being adapted to receive the enlargement 40 on the staff, as shown in Fig. 12. 41, 42, 43, 44, and 45 indicate other positions in which the enlargement may be provided on the staff, the position of such enlargement being varied in connection with different instruments and of course the position of the recesses 39 being also varied, either on the disk or said recesses being provided in a different disk, thus insuring that the staff cannot be inserted in an instrument to which it does not belong. For instance, if a projection is provided on the staff at the position indicated by No. 41 instead of the projection 40 the recesses would be provided in disk 35, Fig. 5, or if in position 42 the recesses 39 in disk 36, Fig. 5, would be on the opposite side of the disk to that shown. A convenient arrangement is to provide two projections on the staff, such as the one marked 40, and another at the position marked 44, Fig. 12. In this case recesses 39 would be provided in the right-hand side of disk 37 in addition to those in disk 36. This provides a very simple means of varying instruments for different sections, as to make one instrument different from another (so that the staffs of one cannot be inserted in the other) it will only be necessary to invert the disk 36 or 37 on their supporting spindle or center. It will be readily understood that the variation of instruments in this manner may be enlarged upon. For the purpose just described the disks are preferably made separate and threaded onto the spindle 6, Fig. 2, instead of being formed together with a common boss or center, as shown in Fig. 5. As an alternative or additional means of preventing a staff belonging to an instrument of one section being placed in an instrument of a section to which it does not apply the distance between the rings on staffs and between the disks of the instruments of such sections can be varied.

Figure 8:
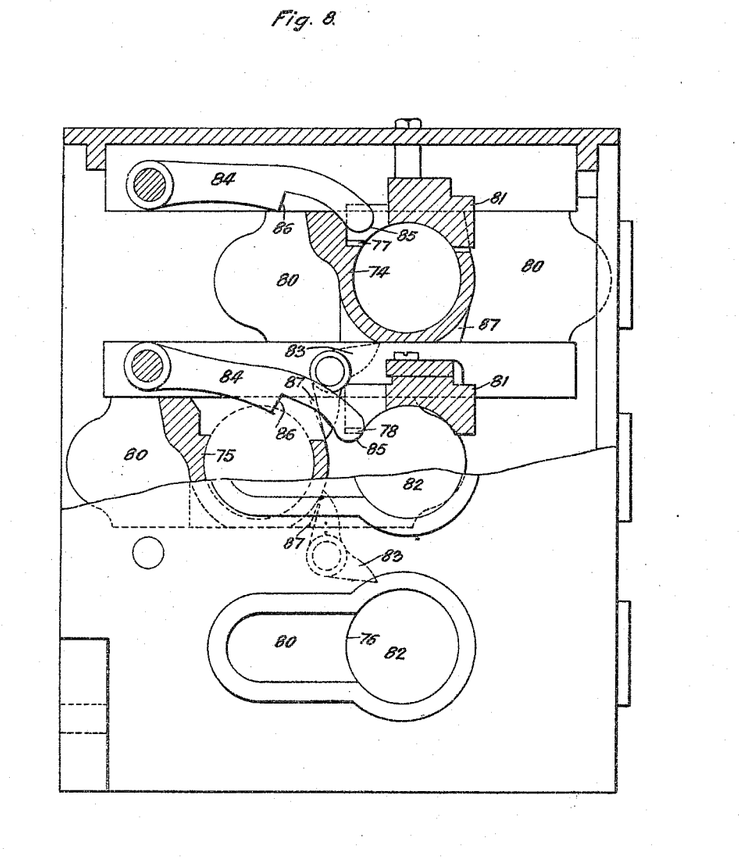
Figure 9:
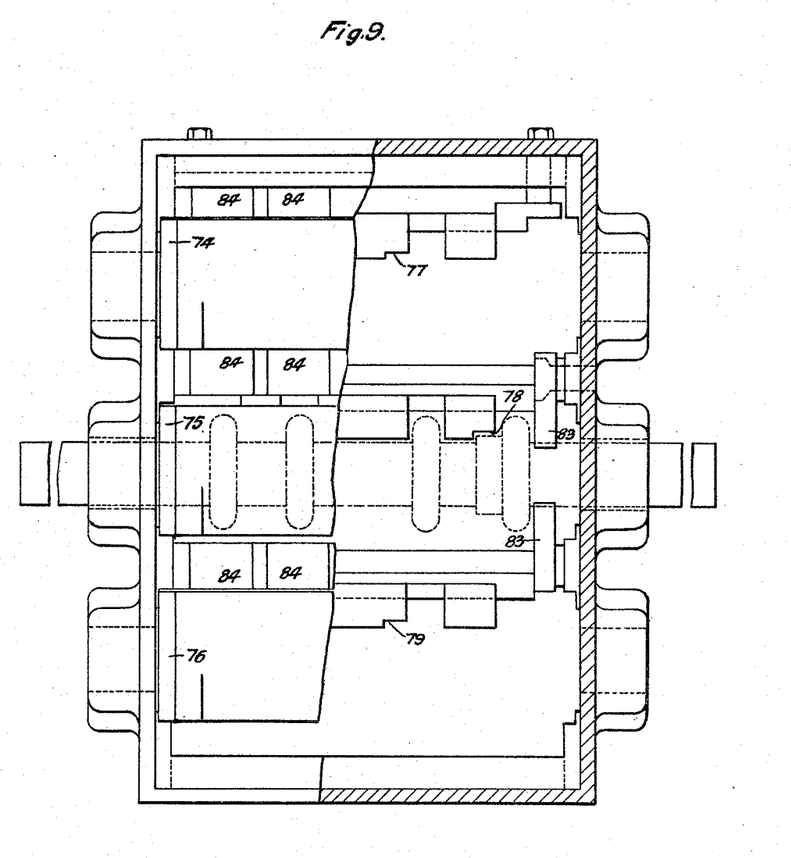
Fig. 9, a back view, partly in section, of the receptacle or apparatus fixed at an intermediate station. This instrument is arranged to hold two staffs corresponding to the shorter section when the instruments relating to the longer section are in use and to hold a staff corresponding to the longer section when the shorter section instruments are in use.

Referring to Figs. 8 and 9, which show the special instrument provided at an intermediate station for use when such station is cut out and the working is over the longer section, the apparatus consists of a cast-iron or other box containing three drawers 74, 75, and 76. Staffs relating to the shorter sections can only be placed in drawers 74 and 76, owing to the projections on said staffs (similar to projection 40, Fig. 12) being formed or arranged on the staff in different positions to the projections on the longer section-staff. (Shown in dotted lines in drawer 75, Fig. 9.) 77, 78, and 79, Fig. 9, are recesses formed in part of the box or apparatus casing, said recesses being formed in various positions in different instruments to accommodate the different positions of the above-mentioned projections on the staffs relating to different sections of the railway or to train movements in different directions, thus insuring that only the proper staff can be inserted in the drawer intended to receive it. 80, Fig. 8, represents side plates or parts of the drawers and work in suitable guideways or supports in the box or apparatus casing. 81 represents fixed projections or parts of the box in which the recesses 77, 78, and 79 are formed. 82 represents the openings through which the staffs are inserted. Staffs can only be taken from and put into the drawers when the drawers are in the forward positions. (See drawers 74 and 76, Fig. 8.) This is provided for by means of the pawls or catches 83, which are pivoted on the instrument box or casing. The pawls 83, as shown, are in engagement with drawer 75 and prevent it being moved to allow the staff in said drawer to be taken out until the drawers 74 and 76 are moved back (toward the left) by means of staffs inserted therein. When drawers 74 and 76 are moved back, the staff in drawer 75 can be withdrawn, as said drawers will then be clear of the pawls 83, thus allowing drawer 75 to be moved forward into line with opening 82, through which the staff can be withdrawn. 84 represents levers pivoted in the casing or box. There are four of such levers for each drawer, two on each side and at each end of the drawer. These levers prevent the drawers being pushed back without the insertion of a proper staff. The rings or keys 70, 71, 72, and 73 on the staffs must engage the ends 85 of levers 84; otherwise said levers will not be lifted, and when the drawer has moved a short distance the shoulders 86 on said levers will engage the drawer (the ends 85 of the levers moving down) and prevent its further movement, whereby (assuming drawer 74 to be the one in question) said drawer will remain in engagement with pawl 83, which pawl is thus retained in engagement with drawer 75, locking it in the position shown and preventing the withdrawal of the staff therefrom. If all the drawers are pushed back to the position of drawer 75, Fig. 9, then the action of pulling forward drawer 75 to withdraw the staff will actuate the pawls 83, so as to engage drawers 74 and 76 and lock them in a similar manner to that previously described with reference to the locking of drawer 75, said pawls engaging the drawers 74 and 76 at the part indicated by the number 87 in Fig. 8.

For cutting out an intermediate station the method of working is as follows: Assuming three stations X Y Z, Y being the station to be cut out, thus making the section from X to Z, there is provided, as usual, an additional staff instrument at X and Z, forming the pair of instruments for working through from X to Z when Y is cut out, said additional instruments being connected by a direct line-wire. Now let it be supposed that station Y is open for the normal short section working. Under these circumstances a staff belonging to the section XZ will be in the middle drawer 75, Figs. 8 and 9. The last train proceeding from X to Z with Y open or working as an intermediate station will proceed with a staff of the section XY as far as Y. Y then asks Z (by the usual signal-code) for a staff of the section YZ, so as to enable him to close his station and work the train. Z gives permission to the signalman at Y, who then withdraws a staff, which he places in drawer 74, Figs. 8 and 9, and on the arrival of the train from X he will place the staff brought by the train in the drawer 76. He can then remove the staff of section XZ from drawer 75, as previously described. This staff he will give to the train as its authority to proceed on to Z, and he will report his station closed to X and Z and working will thence forward proceed direct between X and Z.

To reopen station Y, when the first train arrives at Y the staff belonging to section XZ is placed in the drawer 75, Figs. 8 and 9, and the other two staffs in drawers 74 and 76 are withdrawn. One of these staffs is given as the authority for the train to proceed and the other is to be placed in the staff instrument it belongs to. At the same time Y will advise by a prearranged code on the bells X and Z that the cabin is open.

With this invention no special or additional line-wire is required for the purpose of cutting out an intermediate station, the only electric current employed in connection with cutting out a station being for the bell-code signals worked by the ordinary line-wires. Moreover, neither of the line-wires are interfered with, so whether the intermediate station is open or shut X and Z can exchange signals by the bell, and the line is available for communication by telephone. Similarly before opening station Y the lines XY and YZ are available for communication between Y and X or Z. Again, the operator need not reside at Y, but may arrive with the train opening the station and depart with the train closing the station, which is a considerable advantage, particularly in the case of isolated stations, as it enables him to travel by the train leaving his station to the next station or to a distant point on the line where his presence may be required.

Figure 10:
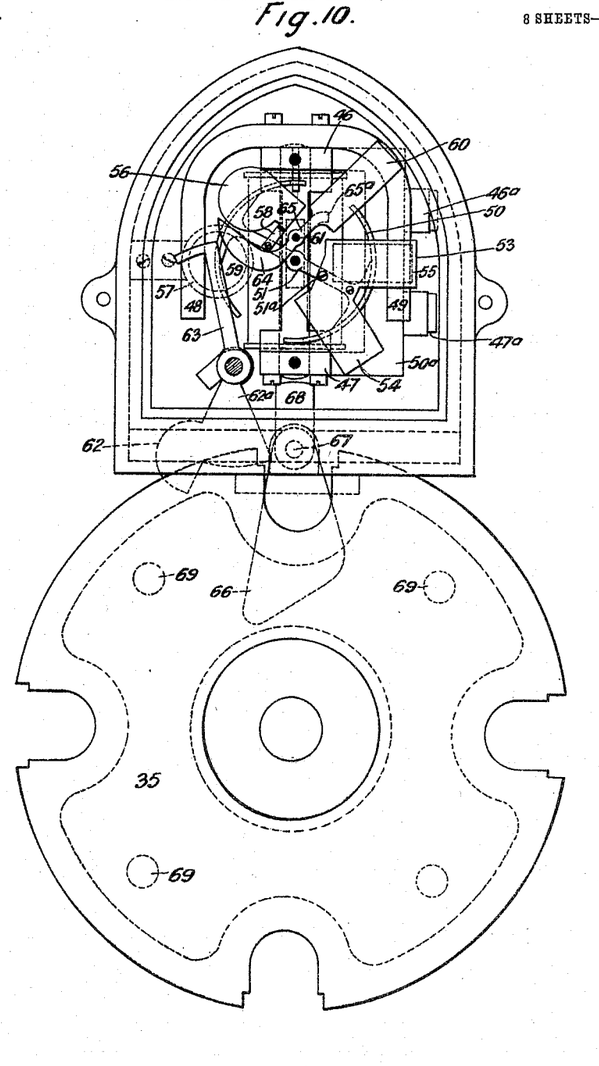
Fig. 10 is a front view of one of the disks and of the indicator mechanism operatively connected therewith.
Figure 11:
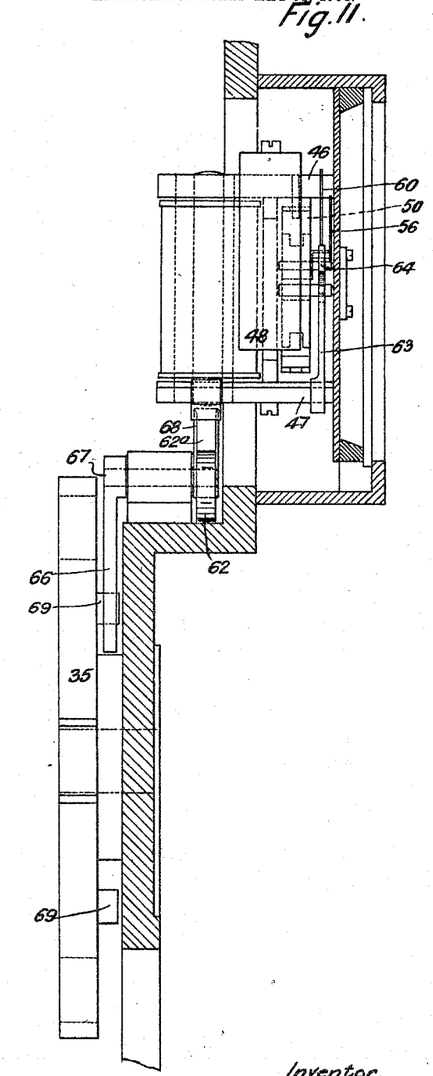
Fig. 11 is a side view of the front disk 35, Fig. 5, with part of the instrument-casing and the indicator-casing shown in section.

Referring to Figs. 10 and 11, which show the indicator, 46 47 are the poles of an electromagnet, and 48 49 the poles of a permanent magnet, which magnets are suitably supported in the instrument-casing. 50 is an armature supported by non-magnetic piece 51, carried on a spindle 52. Flags 53 54, suitably attached to armature 50, are adapted to appear behind the window 55, (shown in dotted lines,) and a flag or disk 56 is also suitably attached to armature 50 and appears at window 57 simultaneously with the appearance of flag 54 at window 55 and indicates that the section of railway is clear and that the signalman may accept another train. The supporting-arm 58 of disk 56, which is screwed onto the piece 51, is so formed or bent that said disk can move into position in front of a fixed red disk 59 behind window 57, said disk 59 indicating "train in section" or "staff out of instrument," disk 59 being a sufficient distance away from the inner edge of window 57 to allow disk 56 to move in front of it. 60 is another flag, pivoted at 61 and adapted to be mechanically operated by the lever or piece 62, whose arm 63 will act on the end 64 of the lever or arm 65, that supports flag 60, when said piece or lever 62 is actuated by the action of withdrawing a staff from the instrument, as hereinafter described, the flag 60 then indicating that a train is proceeding in the direction from the station. The flag 53 indicates that a train is approaching the station and flag 54 that the section is clear. 66 is a lever or piece pivoted on the instrument-casing at 67, (see Figs. 10 and 11,) the upper end 68 of lever 66 being adapted to strike the piece 62 for the purpose of moving flag 60 from the position shown to behind window 55. 69 are pins or projections on disk 35, which when said disk is revolved by the action of withdrawing a staff from the instrument will strike on the left-hand lower end of lever 66, which lever is thus tilted so that its upper end 68 strikes the part 62ª of piece 62, whose arm 63 is thereby caused to act on the end 64 of lever 65, and so moves flag 60 into view behind window 55. 46ª 47ª are leading-in terminals attached to yoke 50ª in connection with the electromagnets.

The indicator-electromagnet is so connected (see Fig. 13) that under the normal conditions when all staffs are present in the instruments currents received from the other station will cause the armature 50 to take up the position with the flags 54 and 56 indicating "line clear." Should a staff have been withdrawn from either instrument, any currents received will then pass through the indicator-magnet of the instrument in the opposite direction and will cause the armature 50 to assume the position shown indicating "staff withdrawn" or "train in section." On withdrawing a staff from the instrument at the station sending the train the rotation of disk 35 at that station will, through pin 69 acting on lever 66, cause flag 60 to appear at window 55, and so gives the indication "train on line going." During this action the projections 65ª on the support of flag 60 will engage the projection 51ª on armature 50 and will move the armature, and consequently flag 53, to the window 55, flag 60 being in front of flag 53. On the operator at this (sending) station sending a current to the other station acknowledging the staff or advising departure of the train (in the usual way) the armature 50 of the indicator at the station to which the train is going will revolve so as to bring flag 53 to the window 55, thus indicating "train on line coming," said flag 53 having been previously moved away from window 55 (and by means of projection 51ª acting on projection 65ª of flag 60 said flag is moved to the position shown) by a current sent through the indicator-magnet when the instruments are normal—*i. e.*, with all staffs in.

Referring again to Fig. 12, 70, 71, 72, and 73 are the usual rings or keys on the staff for actuating the locking pawls or levers (such as those of the well-known Webb and Thompson instruments) in connection with the disks. According to the present invention there are only the four lifting rings or keys on each staff, and in order to prevent a staff being placed in an instrument in an incorrect manner the distance or space between the rings is different, as shown in Fig. 12. For instance, the distance between center of ring 70 and center of ring 71 may be about three-fourths of an inch, between rings 71 and 72 about one and one-fourth inches, and between rings 72 and 73 about seven-eighths of an inch. The distances between pairs of disks, Fig. 5, are of course suitably arranged to suit the position of the rings on the staff. With this arrangement if a staff is placed in the entrance-opening 1, Figs. 1 and 2, so that the ring 70 is to the back of the instrument instead of to the front the staff cannot be moved into the magazine, because the rings will foul the disks, which will thus prevent the staff entering.

Referring to Fig. 14, Sheet 1, as an additional means for preventing a staff being wrongly placed in the instrument I provide projections 71$^a$ 72$^a$ in the staff-entrance 1, Figs. 1 and 2, with pieces cut out, forming recesses 70$^b$ 71$^b$ 72$^b$ 73$^b$ to allow the rings 70 71 72 73 on the staff to pass. The projections 71$^a$ and 72$^a$ correspond in width or size to the distances between rings 70 71 and 72 73, respectively, so that unless a staff is properly placed in the entrance 1 it cannot be moved from there into the magazine.

As an alternative or additional means of preventing a staff being put in an instrument in a wrong manner I arrange a fifth ring, 70$^a$, Fig. 12, which ring normally will pass between disk 35, Fig. 5, and the case of the instrument; but should the staff be put into the instrument in a wrong manner this ring would foul one of the disks.

Figure 13:
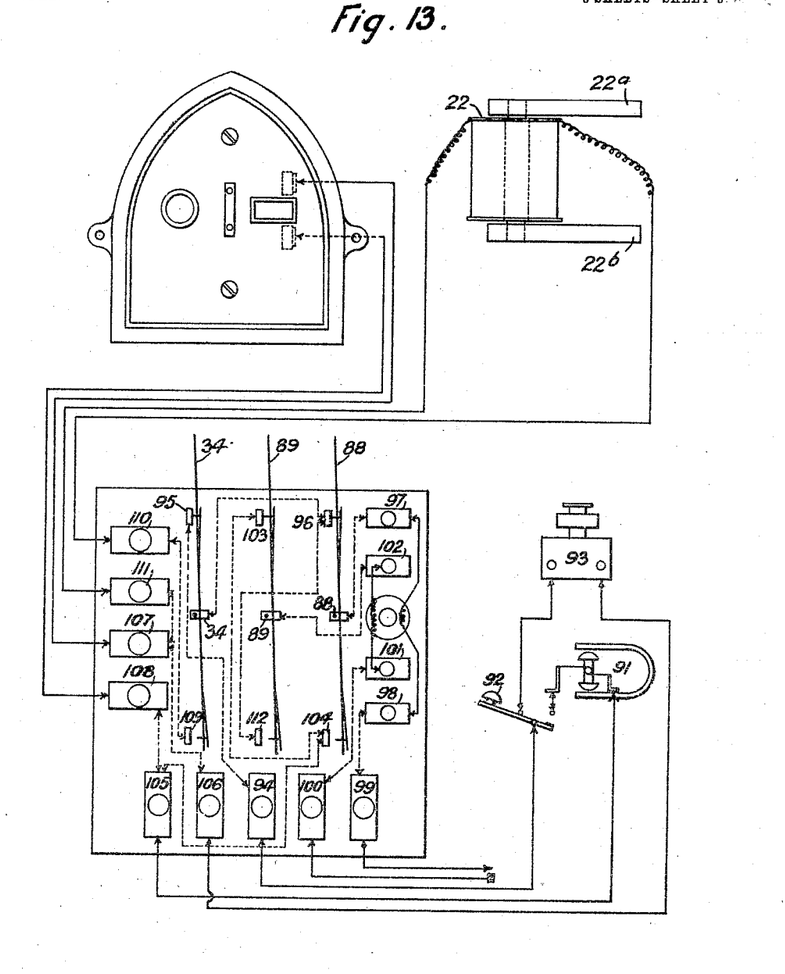
Fig. 13 is a diagrammatic view showing the generator, circuit-wires, terminals, contact-makers, and contacts.

Referring to Fig. 13, 88 and 89 form the reversing-switch, which may be of the known construction and operated in the known manner for interchanging the line and earth connections on withdrawing and replacing a staff in the instrument. 34 is a switch (also of known construction) which is actuated by the safety-lever 21, Fig. 2, through the link 32 and cam 33. 91 is the generator, 92 the key, and 93 a bell. The various currents for giving the signals and operating the lock at the instrument at the far station are set up by depressing key 92 and operating generator 91. On pressing the key 92 and operating the generator a current will be sent from the generator to terminal 94, contact 95, switch-lever 34, through 34 to 96, through lever 88 by terminals 97 and 98 to terminal 99, thence to line and back through earth, through terminal 100, through terminals 101 and 102 to switch 89, thence through contacts 103 and 104 to terminal 105 and back to the generator. A current received from the line will pass by terminal 99 to terminals 98 97 to switch-lever 88, thence by contact 96 to switch-lever 34, thence either by 95 to 94 through key 92 to the bell 93, from terminal 106 to terminal 107, through the indicator to terminal 108, to terminal 105, to contacts 104 103, and lever 89 to earth, or, on raising a staff, switch-lever 34 being held over by the safety-lever 21, the current will pass through said lever and by contact 109 to terminal 110 and thence through the electromagnet 22 to terminal 111, to terminal 107, through the indicator and through terminals 108 and 105, thence to contacts 104 and 103, and through switch-lever 89 to earth.

By the above-described arrangement of contacts and circuits should the operator leave a staff in the curved part 2 of the staff-entrance in the instrument-head, Figs. 1 and 2, instead of completing the operation of putting it into the magazine, or, on the other hand, if he should partially withdraw the staff and not remove it from said curved part, then on pressing the key and operating the generator no current will pass, as the safety-lever 21 will be held up by the staff in the curved part 2, and will thus hold switch-lever 34 over, so that contact is broken at 95, whereby it will be impossible to send a current from a station at which a staff has been only partially withdrawn or inserted to another station to enable the signalman at the latter to withdraw a staff, thus preventing staffs being withdrawn at the same time for sending trains in opposite ditions.

After one staff has been withdrawn from the instrument, the disk 38, Fig. 5, having operated the reversing-switch 89 88, the currents will pass by contacts 104 and 112 instead of by contacts 96 and 103, as previously described.

What I claim, and desire to secure by Letters Patent, is—

1. In staff apparatus for controlling traffic on single-line railways, means whereby the staffs and the rotary disks in the apparatus directly coöperate for the purpose of preventing staffs being wrongly placed in an instrument, substantially as set forth.

2. In staff apparatus for controlling traffic on single-line railways, staffs provided with enlargements and a disk or disks provided with recesses adapted to receive said enlargements only when the proper staffs are inserted or when staffs are properly inserted in the instrument, substantially as described with reference to the accompanying drawings.

3. In staff apparatus for controlling traffic on single-line railways, the combination of a disk or disks provided with recesses, staffs provided with enlargements adapted to enter said recesses, and rings or wards on the staffs so arranged that the distances between pairs of rings are different, substantially as and for the purposes described with reference to the accompanying drawings.

4. In staff apparatus for controlling traffic on single-line railways, the combination, with means whereby the staffs and the rotary disks in the apparatus directly coöperate for the purpose of preventing staffs being wrongly placed in an instrument, of a safety-lever pivoted in the instrument and preventing the illegitimate withdrawal of a staff therefrom, substantially as set forth.

5. In staff apparatus for controlling traffic on single-line railways, the combination, with means whereby the staffs and the rotary disks in the apparatus directly coöperate for the purpose of preventing staffs being wrongly placed in an instrument, of an indicator which shows the presence of the various staffs in the apparatus, substantially as set forth.

6. In staff apparatus for controlling traffic on single-line railways, the combination, with means whereby the staffs and the rotary disks in the apparatus directly coöperate for the purpose of preventing staffs being wrongly placed in an instrument, of an instrument for use in cutting out intermediate stations and adapted to receive two staffs relating to the short sections and one staff relating to the long section, substantially as set forth.

7. In a staff apparatus for controlling traffic on single-line railways, the combination, with a magazine for the staffs, of a lever 9 pivoted in the upper part of the said magazine, an electromagnet supported by the said lever, a permanent magnet also supported by the said lever, an armature pivoted on the said lever, a hook 27 pivoted concentric with the said armature and operated by it, and a locking-lever 8 also pivoted in the upper part of the magazine and provided with a hook 29 with which the said hook 27 engages when the said electromagnet is energized to move the said armature in one direction, substantially as set forth.

In testimony whereof I affix my signature in presence of two witnesses.

EDWARD WYTHE SMITH.

Witnesses:
 ARTHUR NIBLACK,
 WALTER E. ROCLEE.